United States Patent [19]

Atkins

[11] Patent Number: 4,661,464

[45] Date of Patent: Apr. 28, 1987

[54] STABILIZED PILLARED LAYERED CLAY, PROCESS FOR ITS PRODUCTION

[75] Inventor: Martin P. Atkins, Egham, England

[73] Assignee: The British Petroleum Company, p.l.c., London, England

[21] Appl. No.: 622,847

[22] Filed: Jun. 21, 1984

[30] Foreign Application Priority Data

Jun. 25, 1983 [GB] United Kingdom ............... 8317328

[51] Int. Cl.$^4$ .................. B01J 21/16; B32B 5/18; C01F 5/02; C01B 35/02
[52] U.S. Cl. ......................... 502/84; 502/80; 423/118; 423/277; 423/328
[58] Field of Search .......... 501/146, 148; 502/80, 502/84, 62; 423/277, 118, 327–328

[56] References Cited

U.S. PATENT DOCUMENTS

| | | | |
|---|---|---|---|
| 3,671,190 | 6/1972 | Neumann | 423/118 |
| 4,053,324 | 10/1977 | Haden, Jr. et al. | 501/146 X |
| 4,176,090 | 11/1979 | Vaughan et al. | 502/84 X |
| 4,248,739 | 2/1981 | Vaughan et al. | 502/63 |
| 4,271,043 | 6/1981 | Vaughan et al. | 502/84 X |
| 4,436,832 | 3/1984 | Jacobs et al. | 423/118 X |
| 4,451,440 | 5/1984 | Thompson, III | 501/148 X |
| 4,507,399 | 3/1985 | Miller et al. | 502/84 X |
| 4,510,257 | 4/1985 | Lewis et al. | 502/80 X |
| 4,515,901 | 5/1985 | Elattar | 502/80 X |

*Primary Examiner*—Donald R. Valentine
*Attorney, Agent, or Firm*—Brooks, Haidt, Haffner & Delahunty

[57] ABSTRACT

A stabilized pillared layered clay comprising a layered clay pillared by the residue of a material which has reacted with hydroxyl groups associated with the clay structure and its preparation by reacting under substantially anhydrous conditions in an organic solvent a layered clay having hydroxyl groups associated with its structure with a material capable of reacting with the hydroxyl groups and leaving a residue of the material, for example a boron trihalide, thereby pillaring the clay.

19 Claims, No Drawings

STABILIZED PILLARED LAYERED CLAY, PROCESS FOR ITS PRODUCTION

The present invention relates to a stabilised pillared layered clay, to a process for its production and to its use as a catalyst, a catalyst support and a sorbent.

Natural and synthetic clays having a lamellar structure with interlamellar spaces disposed between the lamellar layers are well known. Smectites, such as bentonite, montmorillonites and chlorites are a class of clays possessing such a lamellar structure. Montmorillonite has an idealised stoichiometric composition corresponding to $Na_{0.67}Al_{3.33}Mg_{0.67}(Si_8)O_{20}(OH)_4$. Structurally, it comprises a central layer containing octahedrally coordinated aluminium and magnesium in the form of their oxides and hydroxides sandwiched between two layers containing tetrahedrally coordinated silicon essentially in the form of its oxide. Normally in nature cations are present to compensate for the charge inbalance caused by isomorphous substitution of $Mg^{2+}$ for $Al^{3+}$ in the octahedral layer, and/or $Al^{3+}$ or other ions for $Si^{4+}$ in the tetrahedral layers. The octahedral and tetrahedral regions are tightly bound together to form a lamellar layer. The space between these lamellar layers, i.e. the interlamellar space, in natural clays is normally occupied by exchangeable $Ca^{2+}$ or $Na^+$ ions. Structural hydroxyl groups are also present in the lattice structure of the clay.

The distance between the interlamellar layers can be substantially increased by absorption of a variety of polar molecules such as water, ethylene glycol, amines etc., which enter the interlamellar space and in doing so push apart the lamellar layers.

A disadvantage of the clays for certain applications is that the interlamellar spaces tend to collapse when the molecules occupying the space are removed, for example by heating the clay at a high temperature. Collapse of the clay's layered structure is generally associated with a loss in catalytic activity.

It is known that collapse of the interlamellar spaces can be prevented by inserting props or pillars in the interlamellar space between the lamellar layers. Thus, U.S. Pat. No. 4,176,090 describes and claims an interlayered smectite clay product which includes an inorganic oxide selected from the group consisting of alumina, zirconia and mixtures thereof between the layers thereof, and which possesses an interlayer distance of from about 6 to 16 Angstroms, said interlayered clay having greater than about 50 percent of its surface area in pores of less than 30 Angstroms in diameter. Such clays can be produced by (a) reacting a smectite with a mixture of a polymeric cationic hydroxy inorganic metal complex selected from the group comprising aluminium and zirconium complexes and mixtures thereof and water to obtain a smectite having greater than 50 percent of its surface area in pores of less than 30 Angstroms in diameter after dehydration; and (b) separating the interlayered smectite from the mixture. An improvement in this method of preparation is described in U.S. Pat. No. 4,248,739 whereby the smectite is reacted with a high molecular weight cationic hydroxy metal complex and copolymers thereof having a molecular weight of from about 2000 to 20,000.

Finally, U.S. Pat. No. 4,216,188 discloses a process for the production of molecular sieves which comprises reacting a colloidal solution of a monoionic montmorillonite having a concentration of 100 mg to 800 mg montmorillonite per liter, in the form of fully dispersed negatively charged unit layers at room temperature, with an aged sol of a metal hydroxide aged for at least 5 days at ambient temperature, said metal hydroxide being selected from the group consisting of aluminium hydroxide and chromium hydroxide, at a pH adjusted below the zero charge point having a residual net positive charge on the said metal hydroxide, under vigorous agitation, resulting in a rapid flocculation of the montmorillonite cross-linked with said metal hydroxide, separating the product from the liquid phase, and stabilizing the product by heat treatment.

The aforesaid methods rely upon ion-exchange of an exchangable cation of the clay with a hydroxy polymeric cationic species.

We have now found that novel stabilised pillared layered clays can be obtained by reacting hydroxyl groups associated with the lamellar layers of the clay with a compound capable of reacting with hydroxyl groups and leaving a residue thereby forming a pillar.

Accordingly, the present invention provides a stabilised pillared layered clay comprising a layered clay pillared by the residue of a material which has reacted with hydroxyl groups associated with the clay structure.

By stabilised clays we mean clays in which the interlayer space is not substantially reduced or eliminated by heating at a temperature at which the interlayer space in the corresponding naturally occurring clay would be eliminated or substantially reduced.

The clay may be any suitable natural or synthetic layered clay. Naturally occurring smectite clays are preferred on the grounds of cheapness and widespread availability. Examples of naturally occurring smectite clays include hectorite, chlorite, bentonite, montmorillonite, beidellite and analogues thereof. Synthetic interlayered clays, such as those disclosed in U.S. Pat. Nos. 3,803,026, 3,844,979, 3,887,454, 3,896,655, 3,275,757, 3,252,889, 3,586,478, 3,666,407 and 3,671,190 are also embraced within the scope of the invention. Vermiculite may also be used.

The residue may be in any form and may be linked to one or more of the clay layers through oxygen bridging bonds. Alternatively, the residue may be interposed between the layers without being bound to them. A particularly suitable residue is a Lewis acid, such as magnesia or boria, preferably boria ($B_2O_3$). By incorporating a Lewis acid to separate the layers the activity of the clay as compared with prior art pillared clays and naturally occurring or ion-exchanged layered clays as a catalyst in certain reactions catalysed by protons can be enhanced because the Bronsted and Lewis acidity normally associated with interlayered smectite clays can be supplemented by the additional Lewis acidity contributed by the Lewis acid separating the layers.

In a particular aspect the invention provides a stabilised pillared layered clay comprising a layered clay pillared by boria.

In another aspect the invention provides a stabilised pillared layered clay comprising a layered clay pillared by magnesia.

In another embodiment the invention provides a process for the production of a stabilised pillared layered clay as hereinbefore described which process comprises reacting under substantially anhydrous conditions in an organic solvent a layered clay having hydroxyl groups associated with the structure thereof with a material capable of reacting with the hydroxyl groups and leaving a residue of the material, thereby pillaring the clay.

Preferably, in a first step, some or all of the absorbed water of the layered clay can be removed by any suitable method, for example azeotropic distillation or heating at a temperature which does not result in collapse of the layered structure of the clay. Alternatively, the absorbed water may be removed in whole or in part by using an excess of the material capable of reacting with hydroxyl groups.

Any material capable of reacting with hydroxyl groups can be used. Suitable materials include, for example boron trihalides, Grignard reagents and organometallic reagents, for example organolithium compounds. Preferably the boron trihalide is boron trifluoride in the form of its etherate. Any Grignard reagent, such as those conforming with the formula RMgX, wherein R is an organic moiety and X is a halide, may be employed. Suitably the group R may be a substantially hydrocarbyl group, for example an alkyl, cycloalkyl, aryl or alkaryl group. Suitably the group X may be chloride, bromide or iodide. The active organic moiety of the organometallic reagent may suitably be a substantially hydrocarbyl group, for example an alkyl, cycloalkyl, aryl or alkaryl group.

It is preferred to employ a stable form of these materials, such as for example a boron trihalide etherate because they are less sensitive to moisture and also because reaction with hydroxyl groups can be effected under milder conditions.

The organic solvent may suitably be a hydrocarbon solvent, which may be aliphatic or aromatic. Suitable examples of useful solvents include paraffins, for example hexane, and aromatic solvents such as benzene and toluene. Alternatively, other solvents such as ethers may be employed.

The exchangeable cations of the clay may suitably be exchanged with other cations prior to reaction with the material capable of reacting with hydroxyl groups. Alternatively, the naturally occurring clay may be used. Cation exchange may be effected by any technique known in the art, such as for example by the methods described in our European patent applications publication Nos 0031687 and 0031252. Examples of suitable cations which may be exchanged with cations originally present in the clay include ammonium, hydrogen, aluminium, chromium, cobalt, nickel, iron, copper and vanadium cations.

The reaction of the clay with the material capable of reacting with hydroxyl groups may be effected over a wide range of reaction conditions. The pressure may suitably be atmospheric or superatmospheric. Using boron trifluoride, for example, reaction may be effected at ambient or an elevated temperature up to the reflux temperature of the solvent employed. Preferably the reaction temperature is in the range from room temperature to 150° C.

The preparation may be carried out continuously or batchwise.

The residue of the material originally interposed may be subsequently modified, for example by heating. In the case of residues derived from boron trifluoride, for example, the residue may suitably be modified by heating at temperatures up to about 400° C.

Before use as a catalyst, if cation-exchange of the original cations present in the layered clay has not been effected prior to reaction of the clay with the material capable of reaction with hydroxyl groups, it is preferred to exchange the exchangeable cations of the stabilised pillared layered clay with suitable cations, for example hydrogen, ammonium and metals and preferably with hydrogen, aluminium, iron, manganese or chromium ions. Alternatively, the stabilised pillared layered clay may suitably be modified by cation-exchange following treatment with a base, such as ammonia. The nature of this process is described in GB Patent Appln. No 2059408A for example, to which reference may be made for further details.

The stabilised pillared layered clay of the present invention may be used as a catalyst in any batch or continuous process capable of catalysis by protons and/or Lewis acids, for example:

(i) a process for the production of an ether by reacting either an olefin or an olefin oxide with an alcohol, (ii) a process for the production of an ether by conversion of either a primary or secondary aliphatic alcohol, a polyol or an olefin oxide, (iii) a process for the production of an alkyl aromatic compound by reacting an aromatic compound with either an alcohol or an olefin, (iv) a process for the production of an alcohol by reacting an olefin with water, (v) a process for the production of an ester by reacting either an olefin or an olefin oxide with a carboxylic acid, (vi) a process for the transalkylation or dealkylation of alkyl aromatic hydrocarbons.

(vii) a process for the conversion of a $C_2$ to $C_{10}$ aliphatic linear olefin to a product comprising hydrocarbons of higher carbon number including one or more of dimers, oligomers, alkanes, olefins and aromatics, (viii) a process for the decomposition of hydroperoxides, (ix) a process for the production of alkylphenols by the alkylation of phenol.

For further details, particularly with regard to the nature of the reactants, catalytically desirable cations, process conditions and the like, for the aforesaid processes (i) to (v) the reader is referred to our European application publication No 0083970 (BP Case 5306), which is incorporated herein by reference.

As regards process (vi), i.e. a process for the transalkylation or dealkylation of alkyl aromatic hydrocarbons, further details may be found in our copending European application No. 83307022.0 (BP Case No. 5445). The stabilised pillared layered clay may saitably be cation-exchanged with either hydrogen ions or cations of the metals chromium, aluminium, cobalt, nickel, iron, copper or vanadium, preferably hydrogen ions, chromium ions or aluminium ions.

With regard to the dealkylation and transalkylation reactions, the alkyl aromatic hydrocarbon may suitably be a mono- or poly- $C_1$ to $C_{10}$-alkyl substituted benzene, naphthalene or other polycyclic aromatic hydrocarbon. The alkyl substituent may, if desired, be functionalised, that is it may be, for example, an alkoxy or hydroxyalkyl substituent. Alternatively, in addition to alkyl substituent(s) the aromatic hydrocarbon may contain other substituents, such as for example hydroxyl groups. Preferably the alkyl aromatic compound is an alkyl benzene. Mixtures of alkyl aromatic hydrocarbons may also be employed. Furthermore, inert diluents such as for example aliphatic hydrocarbons or naphthenes may be employed if so desired. Suitable mixtures include those containing alkyl aromatic hydrocarbons obtained by the distillation or fractionation of petroleum refinery streams, such as those derived from catalytic or steam crackers.

It will be appreciated by those skilled in the art that one or more types of transalkylation reactions as hereinbefore defined may occur in certain reaction mixtures, the scope for and extent of these different types of transalkylation reactions being dependent on, amongst other factors, the nature of the reactants.

A preferred transalkylation reaction is the reaction of a dialkyl benzene, wherein the alkyl substituent is ethyl or isopropyl, with benzene to produce the corresponding monoalkyl benzene, e.g. the reaction of diisopropylbenzene with benzene to produce isopropylbenzene (cumene). Mixtures of dialkyl benzenes with other alkyl benzenes, e.g. trialkyl benzenes, may be employed.

Another preferred transalkylation reaction is the conversion of toluene to a product comprising benzene and xylenes.

Another preferred transalkylation reaction is the conversion of diisopropylbenzene into a product comprising monoisopropyl benzene and triisopropylbenzene.

Another preferred transalkylation reaction is the isomerisation of polyalkylbenzenes, for example the isomerisation of meta-diisopropylbenzene to a product predominantly comprising meta- and paradiisopropylbenzenes.

Transalkylation may be effected in the liquid phase or in the vapour phase. The conditions under which transalkylation may be effected will depend to some extent on the reactants selected and on whether the process is operated in the liquid phase or the vapour phase. Generally in the liquid phase elevated temperatures, suitably in the range 100° to 450° C., preferably from 150° to 300° C., may be employed, and the pressure may suitably be at least the pressure required to maintain the reactants in the liquid phase at the reaction temperature. Generally in the vapour phase, elevated temperatures, suitably in the range 100° to 450° C. may be employed.

The transalkylation and/or dealkylation reactions may conveniently be carried out concurrently with alkylation.

Accordingly, in a preferred embodiment (A) the invention comprises reacting in the liquid phase in an alkylation zone an aromatic hydrocarbon with an alkylating agent selected from $C_2$ to $C_{10}$ alcohols and olefins, and optionally also an inert diluent, under alkylation conditions in the presence as catalyst of a cation-exchangeable layered clay or stabilised pillared layered clay to form a product comprising unreacted aromatic hydrocarbon, monoalkylated aromatic hydrocarbon and polyalkylated aromatic hydrocarbon, recovering some or all of the monoalkylated aromatic hydrocarbon and some or all of the inert diluent if present from the product and either:

(a) recycling all or part of the remainder of the product comprising aromatic hydrocarbon, inert diluent if any, any monoalkylated aromatic hydrocarbon and polyalkylated aromatic hydrocarbon with the feed to the alkylation zone, or (b) passing all or part of the remainder of the product comprising aromatic hydrocarbon, inert diluent if any, any monoalkylated aromatic hydrocarbon and polyalkylated aromatic hydrocarbon, optionally with additional aromatic hydrocarbon and/or polyalkylated aromatic hydrocarbon, to a transalkylation and/or dealkylation zone wherein it is contacted with a catalyst comprising a cation-exchangeable or stabilised pillared layered clay as hereinbefore described under transalkylation and/or dealkylation conditions and recovering therefrom a monoalkylated aromatic hydrocarbon, or (c) separating the aromatic hydrocarbon and some or all of the inert diluent if present from the polyalkylated aromatic hydrocarbon, passing the polyalkylated aromatic hydrocarbon and any remaining inert diluent to a transalkylation and/or dealkylation zone wherein it is contacted with a cation-exchangeable stabilised pillared layered clay catalyst as hereinbefore described under transalkylation and/or dealkylation conditions and recovering a monoalkylated aromatic hydrocarbon therefrom.

In certain circumstances it may be preferable to carry out the alkylation reaction and the transalkylation and/or dealkylation reactions separately. By operating in this manner the formation of undesirable by-products can be reduced.

Accordingly in a further preferred embodiment (B) the invention comprises in a first step reacting in the liquid phase in an alkylation zone under alkylation conditions an aromatic hydrocarbon with an alkylating agent selected from $C_2$ to $C_{10}$ alcohols and olefins, optionally in the presence of an inert diluent, in the presence of a cation-exchangeable layered clay or stabilised pillared layered clay to form an alkylation product comprising unreacted aromatic hydrocarbon, monoalkylated aromatic hydrocarbon, polyalkylated aromatic hydrocarbon and inert diluent if present and in a separate second step reacting the alkylation product from the first step in a transalkylation and/or dealkylation zone under transalkylation and/or dealkylation conditions in the presence of a catalyst comprising a cation-exchangeable or stabilised pillared layered clay so as to increase the proportion of the monoalkylated aromatic hydrocarbon in the alkylation product, recovering some or all of the monoalkylated aromatic hydrocarbon and some or all of the inert diluent if present and thereafter recycling all or part of the remainder of the product comprising aromatic hydrocarbon, any monoalkylated aromatic hydrocarbon, polyalkylated aromatic hydrocarbon and any inert diluent either:

(a) with the feed to the transalkylation and/or dealkylation zone, or (b) with the feed to the alkylation zone, or (c) both (a) and (b).

In the preferred embodiments (A) and (B) the aromatic hydrocarbon may suitably be benzene or naphthalene, preferably benzene. The olefin may suitably be ethylene, propylene or a butene, preferably propylene. Suitable alcohols are ethanol, n-propanol and isopropanol. Preferably the alkylating agent is an olefin. Preferably the aromatic hydrocarbon is benzene, the alkylating agent is ethylene or propylene and the monoalkylated aromatic hydrocarbon is ethyl benzene or isopropylbenzene. The inert diluent may be a substantially pure hydrocarbon or mixtures of hydrocarbons, preferably those contained in refinery streams obtained by distillation or fractionation and/or hydrogenation and which contain substantial amounts of the desired olefin or aromatic hydrocarbon.

Alkylation conditions may suitably be a temperature up to 400° C., preferably in the range 100° to 300° C., and an elevated pressure at least sufficient to maintain a liquid phase. In the preferred embodiment (B) the alkylation conditions are preferably such that substantial transalkylation and/or dealkylation is avoided in the alkylation zone and the transalkylation and/or dealkylation conditions are preferably such that transalkylation and/or dealkylation is favoured in the transalkylation and/or dealkylation zone. Suitably this may be achieved by operating the alkylation zone and the transalkylation and/or dealkylation zone at different temperatures, the values of which will depend on the nature of the reactants and the reaction times or flow rates of the reactants. In the case of the production of cumene from propylene and benzene, for example, using residence time of about 30 minutes and a hydrogen ion-exchanged layered clay, the alkylation zone may suitably be maintained at a temperature in the range from 125° to 150° C. and the transalkylation zone may suitably be maintained at a higher temperature, preferably in the range from about 150° to 170° C.

The steps of recovery and separation may suitably be accomplished by fractional distillation.

The process may suitably be carried out batchwise or continuously, preferably continuously.

As regards the process (vii), i.e. the process for the conversion of a $C_2$ to $C_{10}$ aliphatic linear olefin to a product comprising hydrocarbons of higher carbon number, further details may be found in our copending European application No. 84300835.0 (BP Case No. 5512). The stabilised pillared layered clay as hereinbefore described may be cation-exchanged with either hydrogen ions or cations of the metals chromium, aluminium, gallium, cobalt, nickel, iron, copper or vanadium, preferably with hydrogen ions and/or aluminium cations.

The olefin to be converted is a $C_2$ to $C_{10}$, preferably a $C_3$ to $C_6$, aliphatic linear olefin, for example propylene, but-1-ene, 4-methylpent-1-ene, pent-1-ene, hex-1-ene and hex-2-ene. For the avoidance of doubt, olefins di-substituted at the olefinic carbon, for example iosbutene, and tertiary olefins and alpha-methylstyrene are not regarded as aliphatic linear olefins for the purpose of the present invention. As an alternative to feeding individual $C_2$ to $C_{10}$ linear olefins, mixtures of the aforesaid olefins may be employed. Furthermore, the $C_2$ to $C_{10}$ aliphatic linear olefins may be admixed with olefins other than $C_2$ to $C_{10}$ linear olefins, for example branched olefins.

The process may be operated in the liquid phase or in the vapour phase or in a mixed liquid/vapour phase and in the presence or absence of a solvent. For example, using high-boiling normally liquid olefins, the process may be operated in the absence of a solvent. In the case of lower-boiling normally gaseous olefins such as propylene a solvent may be used to provide an essentially liquid or mixed vapour/liquid phase under the reaction conditions. Suitably the solvent may be a normally liquid hydrocarbon, for example n-heptane.

A suitable feedstock is a hydrocarbon mixture comprising olefins and paraffins as found in petroleum refinery streams, sach as those derived from steam or catalytic cracking of petroleum fractions.

The process may be operated at atmospheric or at a superatmospheric pressure, preferably at a pressure sufficient to produce at least in part a liquid phase. The process may suitably be operated at a temperature in the range from 50° to 550° C., preferably from 50° to 450° C.

The actual temperature employed is a factor in determining the nature of the product distribution. As one component of the product there is formed dimers and oligomers of the formula (olefin)$_n$ where n may be in the range 2 to about 6 and especially 2 to 4, for example butene dimers and trimers and propylene trimers and tetramers. Using a mixture of olefins, co-dimers and/or co-oligomers may be produced. Dimers and/or oligomers are generally formed to a greater or lesser extent over the whole of the aforesaid temperature range. Other components of the product can include alkanes and olefins (including diolefins) which may be predominantly branched and surprisingly can have a ranger of carbon numbers which are not simple multiples of the carbon number of the feed olefin or olefins and aromatics which may contain up to 18 or more carbon atoms. At higher temperatures in the aforesaid range the product contains greater proportions of alkanes and aromatics than at the lower temperatures. Generally, substantial amounts of hydrocarbons other than oligomers may be obtained at temperatures above 150° C., preferably above 200° C. and below 450° C.

The process may be operated batchwise or continuously preferably continuously.

The hydrocarbon components of the product may be recovered or separated into suitable fractions by conventional means, for example by fractional distillation. Mixtures of some or all of the hydrocarbon components or fractions may be used as gasoline blending components.

Because the stabilised pillared layered clays according to the invention have a characteristic interlayer spacing and a substantial micropore structure, they are also useful as adsorbents and as catalyst supports.

The invention will now be illustrated by reference to the folowing Examples.

PREPARATION OF BORIA PILLARED LAYERED MONTMORILLONITE CLAY

EXAMPLE 1

A hydrogen ion-exchanged montmorillonite was suspended in hexane and essentially all of the free interlamellar water removed by azeotropic distillation. Boron trifluoride etherate was added to the resulting suspension and the mixture stirred at room temperature under a nitrogen atmosphere for 2 to 3 hours. The solid product was separated by decantation and heated at 100° to 120° C. in vacuo for 4 hours. Hydrogen fluoride was evolved during the heating step.

Analysis of the product showed it to contain 2.35 wt % boron. Boria was identified in the clay product by I.R. spectroscopy.

EXAMPLE 2

A part of the product of Example 1 was heated at 400° C. for 12 hours. After cooling, the clay product had a basal $d_{001}$ spacing (as determined by X-ray diffraction analysis) of 12.7 Angstroms.

Comparison Test 1

A sample of the hydrogen ion-exchanged montmorillonite from the same source as that used in Example 1 was heated at 400° C. for 12 hours. After cooling, the clay product had a basal $d_{001}$ spacing (as determined by XRD analysis) of 9.5 Angstroms, a figure characteristic of a collapsed clay.

It is clear from a comparison of Example 2 with Comparison Test 1 that whereas the original hydrogen ion-exchanged montmorillonite collapses on prolonged heating at elevated temperature, the product of Example 1 does not collapse, which is evidence for the boria identified in the clay behaving as a pillar.

EXAMPLE 3

The procedure of Example 1 was repeated except that the hydrogen ion-exchanged montmorillonite was replaced by an aluminium ion-exchanged montmorillonite.

REACTIONS CATALYSED BY BORIA PILLARED LAYERED MONTMORILLONITE CLAY

EXAMPLE 4

A suspension of the boria pillared interlayered clay produced in Example 2 (3.75g) in acetic acid (30g) was stirred under 50 bar pressure of ethylene at 200° C. for 2.5 hours in an autoclave. The total liquid product was collected and analysed by gas chromatography. It contained 28% w/w ethyl acetate.

Comparison Test 2

The procedure of Example 4 was repeated except that the boria pillared clay was replaced by a non-pillared hydrogen ion-exchanged montmorillonite from the same source as the clay starting material as used in Example 1. The total liquid product contained 25% w/w ethyl acetate.

EXAMPLE 5

To a three-necked round bottom flask was added 1.5g of the boria pillared clay prepared as described in Example 2 and ethanol (143 ml; 2.45 mol). Ethylene oxide (12.3 ml; 0.25 mol) was added dropwise over a 30 minute period with rapid stirring of the suspension.

Gas chromatographic analysis of the liquid products showed that essentially all of the ethylene oxide had been converted to glycol ethers. The major products, excluding solvent, comprised ethyl cellosolve (90% w/w) and ethyl carbitol (10% w/w).

EXAMPLE 6

An autoclave was charged with propylene (40 ml), boria pillared clay prepared as described in Example 2 (3.5 g), water (20 g) and nitrogen (30 bar). The autoclave was heated to 200° C. for 2.5 h and then cooled.

Analysis of the liquid products by gas chromatography showed that isopropanol comprised more than 99% of the product excluding water.

EXAMPLE 7

An autoclave was charged with boria pillared clay prepared as described in Example 2 (3.5 g), propylene (40 ml) and the pressure raised to 40 bar with nitrogen. The contents of the autoclave were heated to 200° C. for 2.5 h and then cooled.

The liquid products were analysed by gas chromatography and comprised propylene dimers (52% w/w), propylene trimers (21% w/w) and propylene tetramers (12% w/w) as the major components.

EXAMPLE 8

A suspension of the boria pillared layered clay (2.0 g) produced in Example 2 in methanol (19 g) and isobutene (25 ml) was stirred under 15 bar pressure of nitrogen at 100° C. for 2 h in an autoclave. The total liquid product (23 g) was collected and analysed by gas chromatography. It contained 20% w/w methyl tertiary butyl ether.

EXAMPLE 9

A suspension of the boria pillared interlayered clay (5.0 g) produced in Example 2 in benzene (120 ml) was stirred under 40 bar pressure of ethylene at 200° C. for 2½ h in an autoclave. The total liquid product (117 g) was collected and analysed by gas chromatography. It contained 21% w/w ethyl benzene.

I claim:

1. A stabilised pillared layered clay comprising a layered clay pillared by boria.

2. A stabilised pillared layered clay comprising a layered clay pillared by a substance selected from the group consisting of magnesia and boria.

3. A stabilised pillared layered clay according to claim 2, pillared by magnesia.

4. A process for the production of stabilized pillared layered clay which process comprises reacting under substantially anhydrous conditions in an organic solvent a layered clay having hydroxyl groups associated with the structure thereof with material capable of reacting with the hydroxyl groups and leaving a residue of the material, said material being a boron trihalide, a Grignard reagent or an organometallic reagent thereby pillaring the clay.

5. A stabilised pillared layered clay according to claim 1, 2 or 4 wherein the layered clay is a naturally occurring smectite clay.

6. A stabilised pillared layered clay according to claim 2 or 4 wherein the smectite clay is either a hectorite, a chlorite, a bentonite, a montmorillonite or a beidellite.

7. A stabilised pillared layered clay according to claim 1 or 4 wherein the layered clay is a synthetic clay.

8. A process according to claim 4 wherein the layered clay is cation-exchanged prior to reaction with the material capable of reacting with hydroxyl groups.

9. A process according to claim 4 wherein the stabilised pillared layered clay is cation-exchanged.

10. A process for the production of a stabilised pillared layered clay,
which process comprises reacting under substantially anhydrous conditions in an organic solvent a layered clay having hydroxyl groups associated with the structure thereof with a material capable of reacting with the hydroxyl groups and leaving a residue of the material, thereby pillaring the clay, wherein said material is a boron trihalide etherate.

11. A process for the production of a stabilised pillared layered clay,
which process comprises reacting under substantially anhydrous conditions in an organic solvent a layered clay having hydroxyl groups associated with the structure thereof with a material capable of reacting with the hydroxyl groups and leaving a residue of the material, thereby pillaring the clay, wherein said material is boron trifluoride.

12. A process capable of catalysis by protons and/or Lewis acids comprising
contacting a substance capable of catalysis by protons and/or Lewis acids with an effective amount of an catalyst comprising
a stabilised pillared layered clay comprising a layered clay pillared by magnesia.

13. A process for the production of a stabilised pillared layered clay, which has been pillared by a substance selected from the group consisting of magnesia and boria, which process comprises reacting under substantially anhydrous conditions in an organic solvent a layered clay having hydroxyl groups associated with the structure thereof with a material capable of reacting with the hydroxyl groups and leaving a residue of the material, thereby pillaring the clay with said magnesia or boria.

14. A process according to claim 13 wherein the layered clay is cation-exchanged prior to reaction with the material capable of reacting with hydroxyl groups.

15. A process for the production of a stabilised pillared layered clay, which has been pillared by a substance selected from the group consisting of magnesia and boria, which process comprises reacting under substantially anhydrous conditions in an organic solvent a layered clay having hydroxyl groups associated with the structure thereof with a material capable of reacting with the hydroxyl groups and leaving a residue of the material, wherein the material capable of reacting with hydroxyl groups and thereby leaving a residue of the material is a boron trihalide, or a Grignard reagent having the formula RMgX, wherein R is a hydrocarbyl group and X is a halide, and thereby pillaring the clay with said magnesia or boria.

16. A process according to claim 15 wherein the material capable of reacting with hydroxyl groups and thereby leaving a residue of the material is a boron trihalide etherate.

17. A process according to claim 16 wherein the boron trihalide is boron trifluoride.

18. A process capable of catalysis by protons and/or Lewis acids comprising contacting a substance capable of catalysis by protons and/or Lewis acids with an effective amount of a catalyst comprising a stabilised pillared layered clay comprising a layered clay pillared by boria.

19. A process capable of catalysis by protons and/or Lewis acids comprising contacting a substance capable of catalysis by protons and/or Lewis acids with an effective amount of a catalyst comprising a stabilised pillared layered clay comprising a layered clay pillared by a substance selected from the group consisting of magnesia and boria.

* * * * *